(12) United States Patent
Fukuyama et al.

(10) Patent No.: US 9,798,074 B2
(45) Date of Patent: Oct. 24, 2017

(54) DISPLAY DEVICE AND PROCESSING APPARATUS USING THE SAME

(71) Applicant: FUJI XEROX CO., LTD., Tokyo (JP)

(72) Inventors: Akio Fukuyama, Kanagawa (JP); Masahiko Nishimoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 21 days.

(21) Appl. No.: 15/086,392

(22) Filed: Mar. 31, 2016

(65) Prior Publication Data

US 2017/0102500 A1    Apr. 13, 2017

(30) Foreign Application Priority Data

Oct. 8, 2015   (JP) ................................. 2015-200131

(51) Int. Cl.
*F21V 7/04* (2006.01)
*F21V 8/00* (2006.01)
*G06F 1/16* (2006.01)

(52) U.S. Cl.
CPC ......... *G02B 6/0088* (2013.01); *G02B 6/0046* (2013.01); *G02B 6/0055* (2013.01); *G02B 6/0068* (2013.01); *G06F 1/1601* (2013.01)

(58) Field of Classification Search
CPC .. G01B 6/0088; G01B 6/0055; G01B 6/0046; G01B 6/0068; G06F 1/1601
USPC ................................ 362/606–609, 612, 632
See application file for complete search history.

(56) References Cited

U.S. PATENT DOCUMENTS

2013/0113823 A1    5/2013   Umezawa et al.

FOREIGN PATENT DOCUMENTS

JP           2013-102350 A        5/2013

*Primary Examiner* — Vip Patel
(74) *Attorney, Agent, or Firm* — Sughrue Mion, PLLC

(57) ABSTRACT

A display device includes a display housing and plural display-light-emitting devices. At least one of the plural display-light-emitting devices includes a light guide member, a holding member, and a light source. The light guide member includes a light incident portion, a light exit portion, and a reflecting portion. The light guide member causes light incident upon the light incident portion to be reflected by the reflecting portion so as to guide the light to the light exit portion. The holding member has an opening so as to house the light guide member, includes an elastically deformable holding piece, and holds the light guide member by using the holding piece. The light source is provided at a portion facing the light incident portion. The holding member has a cut that allows the holding piece to be elastically deformed.

9 Claims, 12 Drawing Sheets

DISPLAY DEVICE AND PROCESSING APPARATUS USING THE SAME

CROSS-REFERENCE TO RELATED APPLICATIONS

This application is based on and claims priority under 35 USC 119 from Japanese Patent Application No. 2015-200131 filed Oct. 8, 2015.

BACKGROUND

Technical Field

The present invention relates to a display device and a processing apparatus using the display device.

SUMMARY

According to an aspect of the present invention, a display device includes a display housing and plural display-light-emitting devices disposed close to one another in the display housing. At least one of the plural display-light-emitting devices includes a light guide member, a holding member, and a light source. The light guide member includes a light incident portion upon which light is incident, a light exit portion through which the light exits, and a reflecting portion. The light guide member causes the light incident upon the light incident portion to be reflected by the reflecting portion so as to guide the light to the light exit portion. The holding member has an opening at a portion thereof facing the light exit portion of the light guide member so as to house the light guide member, includes an elastically deformable holding piece disposed at a portion thereof facing the light incident portion, and holds the light guide member by using the holding piece. The light source is provided at a portion which is in the holding member and which faces the light incident portion of the light guide member. The holding member has a cut that allows the holding piece to be elastically deformed and that is disposed on an opposite side to another of the plural display-light-emitting devices disposed near the at least one of the plural display-light-emitting devices.

BRIEF DESCRIPTION OF THE DRAWINGS

Exemplary embodiment of the present invention will be described in detail based on the following figures, wherein.

DETAILED DESCRIPTION

Outline of Exemplary Embodiment

Figure 1A:
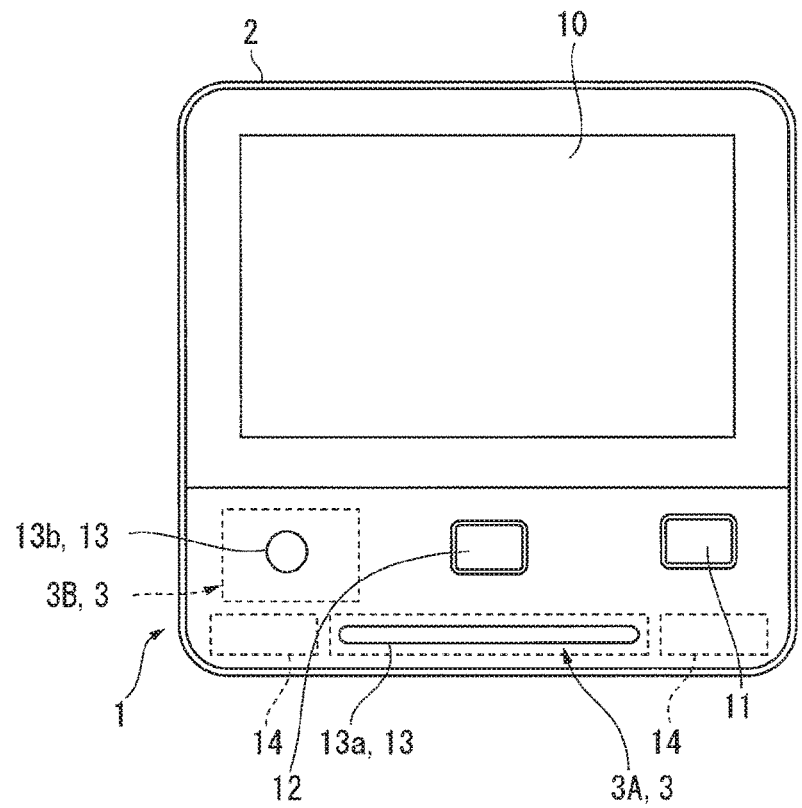
FIG. 1A illustrates an outline of an exemplary embodiment of a display device to which the present invention is applied.
Figure 1B:
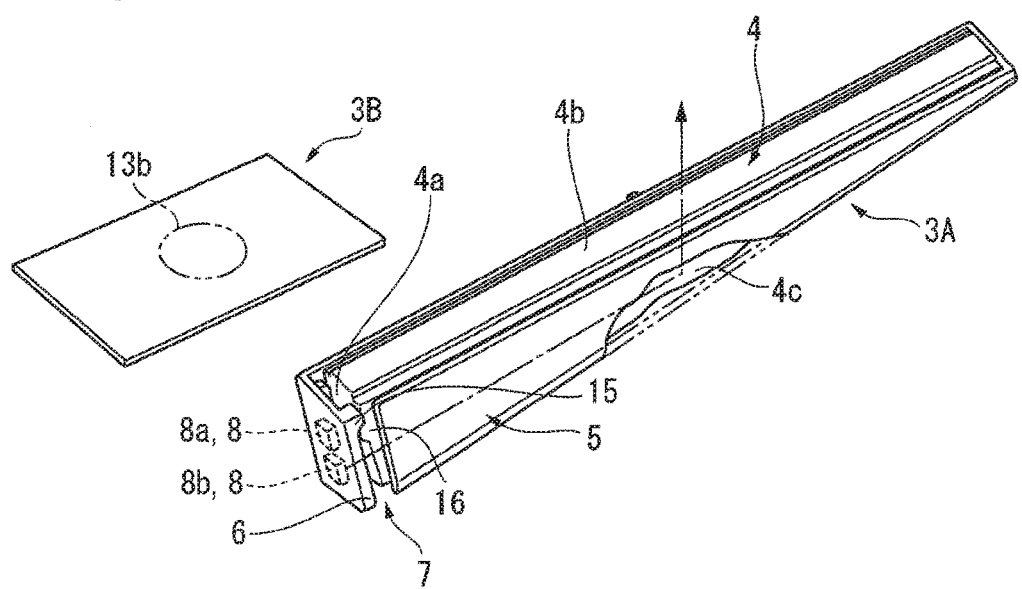
FIG. 1B illustrates part of the display device.

FIGS. 1A and 1B illustrate an outline of an exemplary embodiment of a display device to which the present invention is applied, and out of FIGS. 1A and 1B, FIG. 1A is a plan view illustrating the display device from above, and FIG. 1B is a perspective view illustrating part of the display device.

Referring to FIGS. 1A and 1B, a display device 1 includes plural display-light-emitting devices 3 (3A and 3B according to this example) disposed close to one another in a display housing 2. At least one of the plural display-light-emitting devices 3 (3A according to the present example) includes a light guide member 4 that includes a light incident portion 4a upon which light is incident and a light exit portion 4b through which the light exits. The light guide member 4 causes the light incident upon the light incident portion 4a to be reflected by a reflecting portion 4c so as to guide the light to the light exit portion 4b. The display-light-emitting device 3A also includes a holding member 5 that has an opening at a portion thereof facing the light exit portion 4b of the light guide member 4 so as to house the light guide member 4, that includes an elastically deformable holding piece 6 disposed at a portion thereof facing the light incident portion 4a, and that holds the light guide member 4 by using the holding piece 6. The display-light-emitting device 3A also includes a light source 8 (8a and 8b according to the present example) provided at a portion that is in the holding member 5 and that faces the light incident portion 4a of the light guide member 4. The holding member 5 has a cut 7 that allows the holding piece 6 to be elastically deformed and that is disposed on an opposite side to the other display-light-emitting device 3 (3B according to the present example) near the at least one of the plural display-light-emitting devices.

Referring to FIG. 1A, reference numeral 10 denotes a display screen of, for example, a touch panel type provided in a surface of the display housing 2, reference numeral 11 denotes a power switch, reference numeral 12 denotes a menu switch that causes a menu to be displayed in the display screen 10, reference numeral 13 (13a and 13b according to the present example) denotes illuminated portions provided in the surface of the display housing 2 which display the light from the display-light-emitting devices 3A and 3B, and reference numeral 14 denotes hinge structure (in a form of pair of hinge elements according to the present example) that allows the position of the display device 1 to be changed. Although the illuminated portions 13 are provided at two positons according to the present example, this is not limiting. Of course, the illuminated portions 13 may be provided at three or more positions.

In many cases, the display device 1 of this type is used for a processing apparatus. The processing apparatus may be appropriately selected as long as the processing apparatus includes an apparatus housing in which a processing unit is disposed and the display device 1 attached to the apparatus housing so as to display an operating state of the processing unit. The processing unit herein is not limited to an image forming unit that forms an image on a recording medium. The processing device may be any one of a large variety of units and the like that perform processing on an object. Thus, the processing unit is not limited to an image forming apparatus, and the processing unit may be any one of a large variety of units or the like such as communication devices and electric appliances.

With such a technical structure, the display-light-emitting devices 3 (for example, display-light-emitting device 3B) may be appropriately selected from, for example, the following forms: that is, in a form in which a light source provided on a board emits light; in a form in which a light source provided on a board is caused to emit light and the light is guided to an illuminated portion through a light guide member; and a form in which a light source that emits light in accordance with a signal from a control board is provided and the light from the light source is guided to an illuminated portion through a light guide member.

Furthermore, the one of the display-light-emitting devices 3 (3A according to the present example) includes the light guide member 4, the holding member 5, and the light source 8.

Here, the shape and so forth of the light guide member 4 may be appropriately selected as long as the light guide member 4 includes the light incident portion 4a, the light exit portion 4b, and the reflecting portion 4c. Furthermore, although it is sufficient that the holding member 5 hold the light guide member 4, in order for the holding piece 6 to be elastically deformable, it is required that at least the cut 7 be provided at a portion adjacent to the holding piece 6. Furthermore, the light source 8 (such as a light emitting diode (LED)) is disposed in the holding member 5 and faces the light incident portion 4a so that the light is incident upon the light incident portion 4a of the light guide member 4. Thus, the light from the light source 8 may be unlikely to leak to the outside of the holding member 5.

Furthermore, as long as the cut 7 allows the holding piece 6 to be elastically deformed, the shape, the width, and the depth of the cut 7 may be appropriately selected. Furthermore, since the cut 7 is formed at a position on the opposite side to the other display-light-emitting device 3 (3B according to the present example), even when the light leaks through the cut 7, the light may be unlikely to affect the other display-light-emitting device 3 (3B). Also, the light from the other display-light-emitting device 3 (3B) may be unlikely to enter the light guide member 4 through the cut 7. Furthermore, although the cut 7 is positioned beside the position where the light source 8 is disposed, since most of the light from the light source 8 is directed to the light incident portion 4a of the light guide member 4, the light from the light source 8 may be unlikely to leak through the cut 7.

Next, representative and other forms of the display device according to the present exemplary embodiment will be described. Initially, a representative method of holding the holding piece 6 includes the following form: that is, as illustrated in FIG. 1B, the holding member 5 has a retainer 15 that has a projecting shape or a recessed shape at part of the holding piece 6 facing the cut 7; and the light guide member 4 has a retained portion 16 that has a projecting shape or a recessed shape at part of the light incident portion 4a and that is retained by the retainer 15 after the retained portion 16 has abutted the retainer 15 so as to cause the holding piece 6 to be elastically deformed. According to the present example, a holding capability with which the light guide member 4 is held in the holding member 5 may be increased by utilizing elastic deformation of the holding piece 6. Specifically, the light guide member 4 may be unlikely to be removed from the holding member 5 due to engagement between the retained portion 16 and the retainer 15. Furthermore, both the retainer 15 and the retained portion 16 may be projections. In this case, one of the projections goes over the other projection so as to be retained. Alternatively, one of the retainer 15 and the retained portion 16 may be a projection and the other may be a recess. In this case, the projection is fitted into the recess so as to be retained.

Furthermore, a structure of holding the light guide member 4 by the holding member 5 includes the following form: that is, the holding member 5 has a positioning portion (not illustrated) at a portion thereof facing the holding piece 6; the light guide member 4 is positioned using the positioning portion (not illustrated); the light guide member 4 has a positioned portion at a portion thereof facing the light incident portion 4a; and the positioned portion is engaged with the positioning portion so as to be able to be positioned. According to the present example, the light guide member 4 is positioned on the opposite side to the holding piece 6 in the light guide member 4 and the light guide member 4 is pressed against the opposite side to the holding piece 6 by an elastic action of the holding piece 6. Thus, the light guide member 4 may be held in the holding member 5 with good accuracy. Here, in the form in which, for example, a hole or a recess is used as the positioning portion, a structure that is engaged with the positioning portion such as a projection may be used as the positioned portion.

Furthermore, a representative form of the light guide member 4 includes the following form: that is, the light guide member 4 is an elongated member that extends in a longitudinal direction. One end side in the longitudinal direction serves as the light incident portion 4a and one side surface extending in the longitudinal direction serves as the light exit portion 4b. The width of the light guide member 4 in a direction away from the light exit portion 4b is reduced on the other end side compared to the one end side in the longitudinal direction so as to have the reflecting portion 4c in the other side surface extending along the longitudinal direction and facing the light exit portion 4b. According to the present example, the illuminated portion (for example, 13a) of the display housing 2 may have an elongated shape. Furthermore, compared to the case where the sectional shape is rectangular, a space for disposing another component may be obtained near the light guide member 4 in the display housing 2 corresponding to reduction in the volume occupied by the light guide member 4.

Furthermore, a form of the display device using the hinge structure 14 includes a form in which part of the hinge structure 14 is disposed in the display housing 2. Here, the form of the hinge structure 14 part of which is disposed in the display housing 2 includes a form in which the light guide member 4 is an elongated member that extends in a direction along the rotational center of the hinge structure 14 and that is disposed at a position intersecting the rotational center. According to the present example, the light guide member 4 having an elongated shape is disposed at a position along the rotational center of the hinge structure 14 in the display housing 2. This may realize a layout in which the illuminated portion (for example, 13a) having an elongated shape is provided near the hinge structure 14 of the display housing 2.

A structure of attaching the light source 8 includes a structure in which, in the holding member 5, an attachment opening (not illustrated) used to attach the light source 8 is formed in the holding piece 6, and the light source 8 is attached so as to close the attachment opening. According to the present example, in order to attach the light source 8 to the holding piece 6 of the holding member 5, the attachment opening formed in the holding piece 6 may be utilized as follows: that is, the light source 8 is attached to the attachment opening such that, for example, the attachment opening is closed by a board on which the light source 8 is provided.

A form in which the plural display-light-emitting devices 3 are easily disposed close to one another includes the following form: that is, the area occupied by the display screen 10 is ½ or more of the area of a surface portion of the display housing 2, and the illuminated portions 13a and 13b of the plural display-light-emitting devices 3 (3A and 3B according to the present example) are disposed at a region of the surface portion other than a region occupied by the display screen 10. According to the present example, in order to dispose the display screen 10 having a large area in the display device 1 having a small size, the plural display-light-emitting devices 3 (3A and 3b) are inevitably disposed close to each other. Thus, the present example is an effective form.

Exemplary Embodiment

An exemplary embodiment of the present invention illustrated in the accompanying drawings is described in detail below.

An Overall Structure of an Image Forming Apparatus

Figure 2:
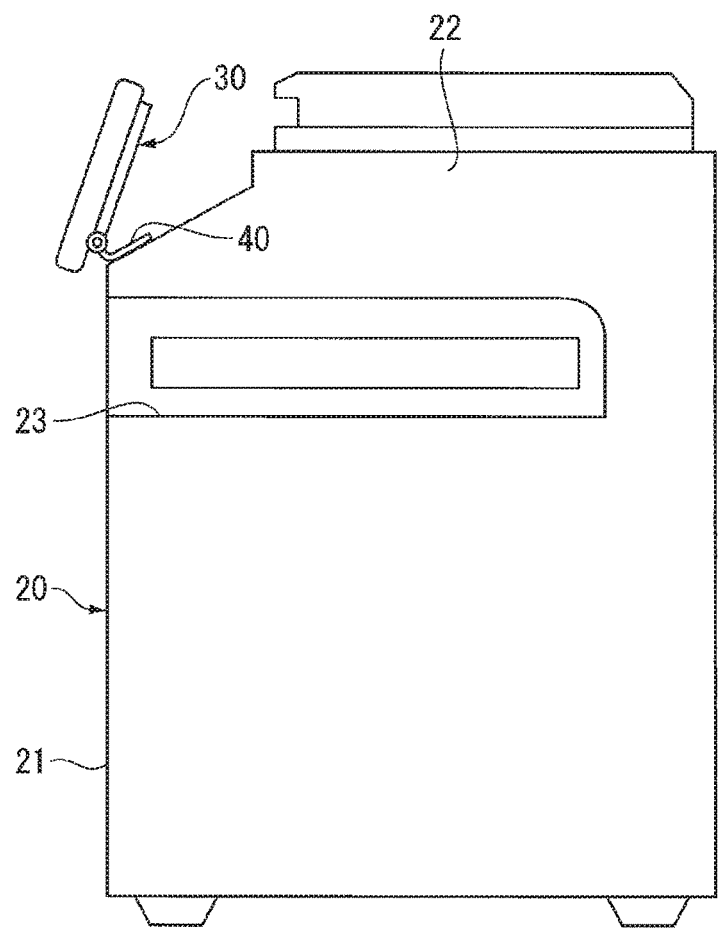
FIG. 2 illustrates an overall structure of an image forming apparatus serving as a processing apparatus according to the exemplary embodiment.

FIG. 2 illustrates an overall structure of an image forming apparatus serving as a processing apparatus according to an exemplary embodiment.

According to the present exemplary embodiment, an image forming apparatus 20 includes, for example, an image forming section (not illustrated), a scanner 22, a recording-medium feeding section (not illustrated), and a recording-medium output section 23. The image forming section is disposed in an apparatus housing 21 and uses an electro-photographic system. The scanner 22 is disposed in an upper portion of the apparatus housing 21 and reads an image. The recording-medium feeding section is provided in a lower portion of the apparatus housing 21. The recording-medium output section 23 is provided by forming a recessed space in a position, for example, below the scanner 22 in the apparatus housing 21. A recording medium on which an image has been formed is output to the recording-medium output section 23.

According to the present example, the recording medium is fed from the recording-medium feeding section, an image such as an image read by the scanner 22 or an image according to a print instruction from a client connected via a network is formed on the recording medium by the image forming section, and then the recording medium on which the image has been formed is output to the recording-medium output section 23.

Furthermore, according to the present exemplary embodiment, an operating panel 30 serving as the display device is provided in front of (left side of FIG. 2) the scanner 22 in the apparatus housing 21. The operating panel 30 is used to operate the image forming section and so forth of the image forming apparatus 20.

Particularly according to the present example, the operating panel 30 is swingably supported by a hinge structure 40, which is disposed at positions in the apparatus housing 21 where the operating panel 30 is disposed. This allows an angular position of the operating panel 30 to be arbitrarily adjusted.

Basic Structure of the Operating Panel

Figure 3:
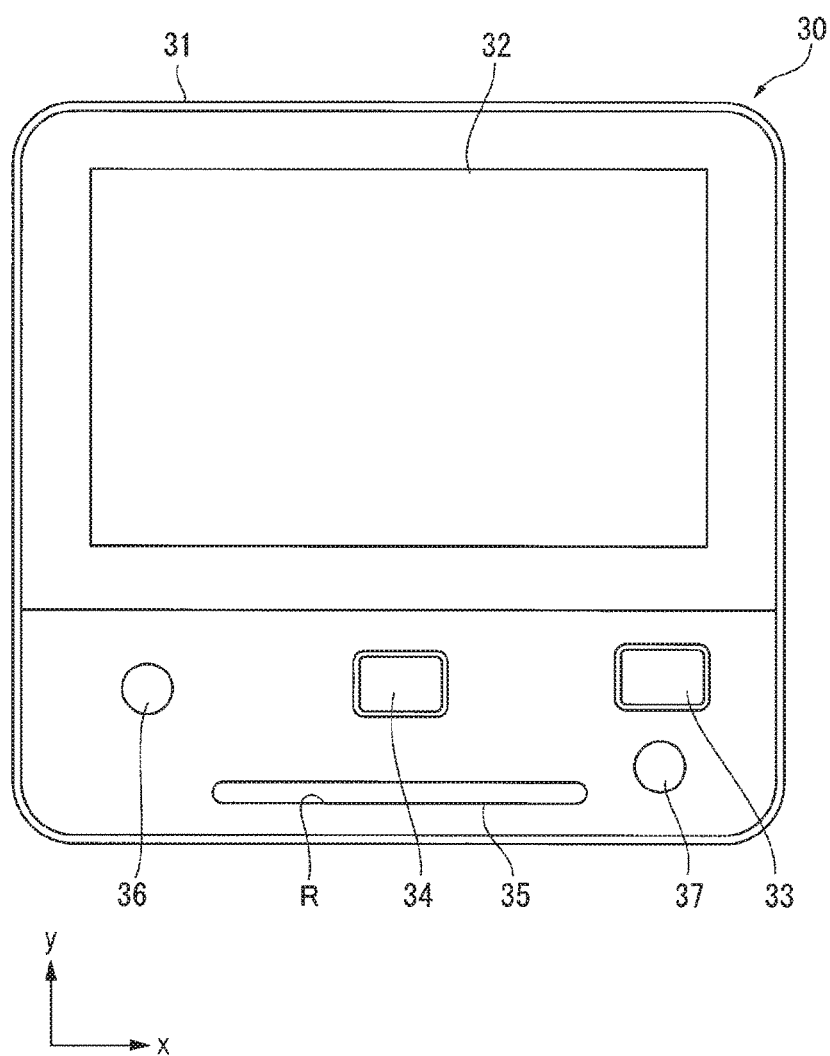
FIG. 3 is a plan view illustrating the display device according to the exemplary embodiment.
Figure 4:
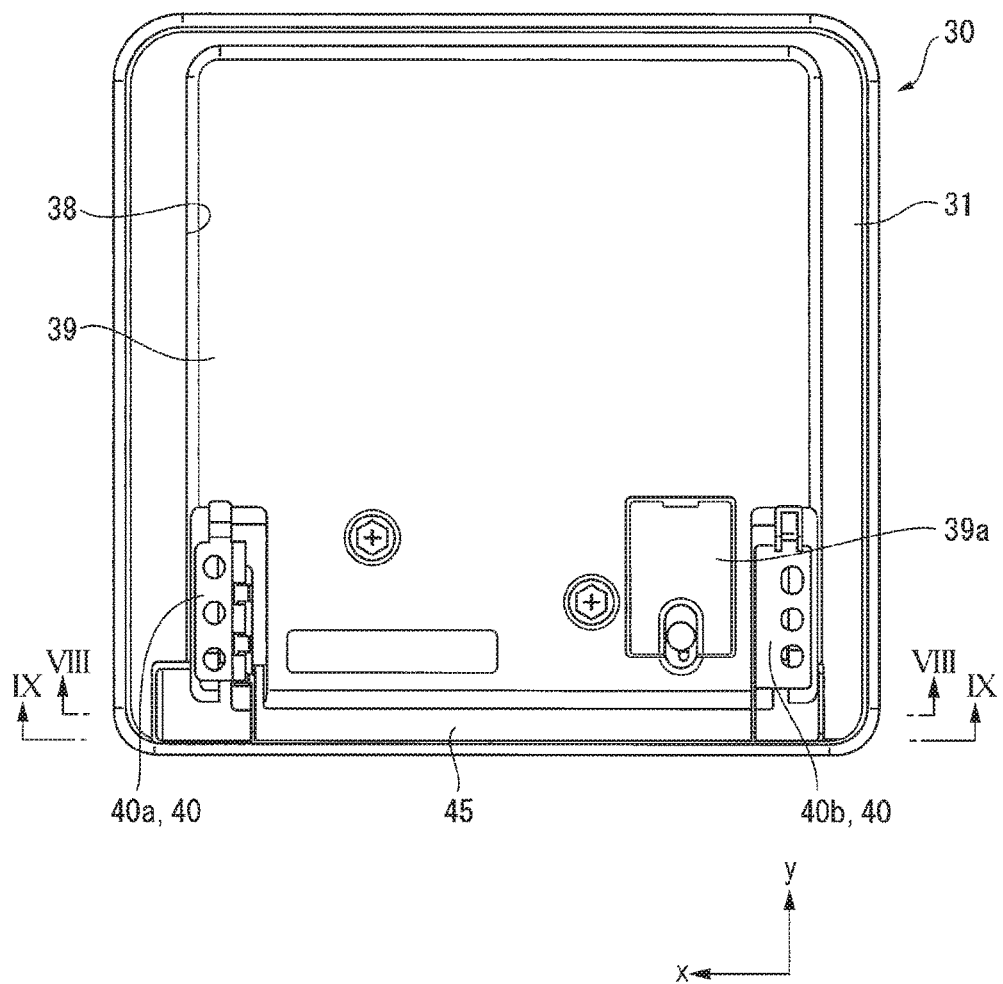
FIG. 4 is a rear view illustrating the display device according to the exemplary embodiment.

According to the present exemplary embodiment, the operating panel 30 includes a touch panel 32 disposed in a surface portion of a display housing 31 as illustrated in FIGS. 3 and 4. The touch panel 32 serves as the display screen and is of, for example, an electrostatic type. The touch panel 32 includes, for example, a liquid crystal display (LCD) that occupies ½ or more of the area of the surface portion of the display housing 31 and is disposed on a side of the touch panel 32 far from the hinge structure 40. Here, in order to operate the image forming apparatus 20 by using the touch panel 32, it is sufficient for an operator to touch a dot or a region of a picture, a histogram, or the like displayed on the touch panel 32 by hand. This causes information on a touched position in the screen to be detected by a change in electrostatic capacitance, thereby a control signal is output to the image forming apparatus 20. Although the electrostatic-type touch panel 32 is adopted according to the present example, this is not limiting. The touch panel 32 may be of a pressure sensitive type. In such a case, the information on the position in the screen may also be detected by touching the touch panel 32 by hand or pressing the touch panel 32 with, for example, a dedicated touch pen referred to as a stylus. Furthermore, a button-shaped power switch 33 and a button-shaped menu switch 34 are provided in a region other than the touch panel 32 in the surface portion of the display housing 31. The power of the image forming apparatus 20 is turned on and off with the power switch 33. A menu to be displayed on the touch panel 32 is selected by the menu switch 34.

Furthermore, according to the present example, plural (three according to the present example) illuminated portions 35 to 37 are provided in the surface portion of the display housing 31. According to the present example, the plural illuminated portions 35 to 37, that is, the first to third illuminated portions 35 to 37 are display windows that each include a transparent or semi-transparent member. The first illuminated portion 35 indicates machine state information of the image forming apparatus 20. The second illuminated portion 36 indicates an operating state of near field communication (NFC) that may be performed with, for example, a portable terminal. The third illuminated portion 37 indicates that data, for example, data in accordance with the print instruction from the client connected through the network is being received.

Elements Disposed in the Operating Panel

According to the present exemplary embodiment, as illustrated in FIG. 4, the display housing 31 has an opening 38 in a rear surface thereof. The opening 38 is closed by a rear covering 39 that is attachable to and detachable from the display housing 31. Reference numeral 39a denotes a rear small covering that closes a small opening formed in part of the rear covering 39. The rear small covering 39a is attachable to and detachable from the rear covering 39.

According to the present exemplary embodiment, parts of a pair of hinge elements of the hinge structure 40 are separately disposed at positions along one side edge on a side of the display housing 31 far from the touch panel 32.

Figure 5:
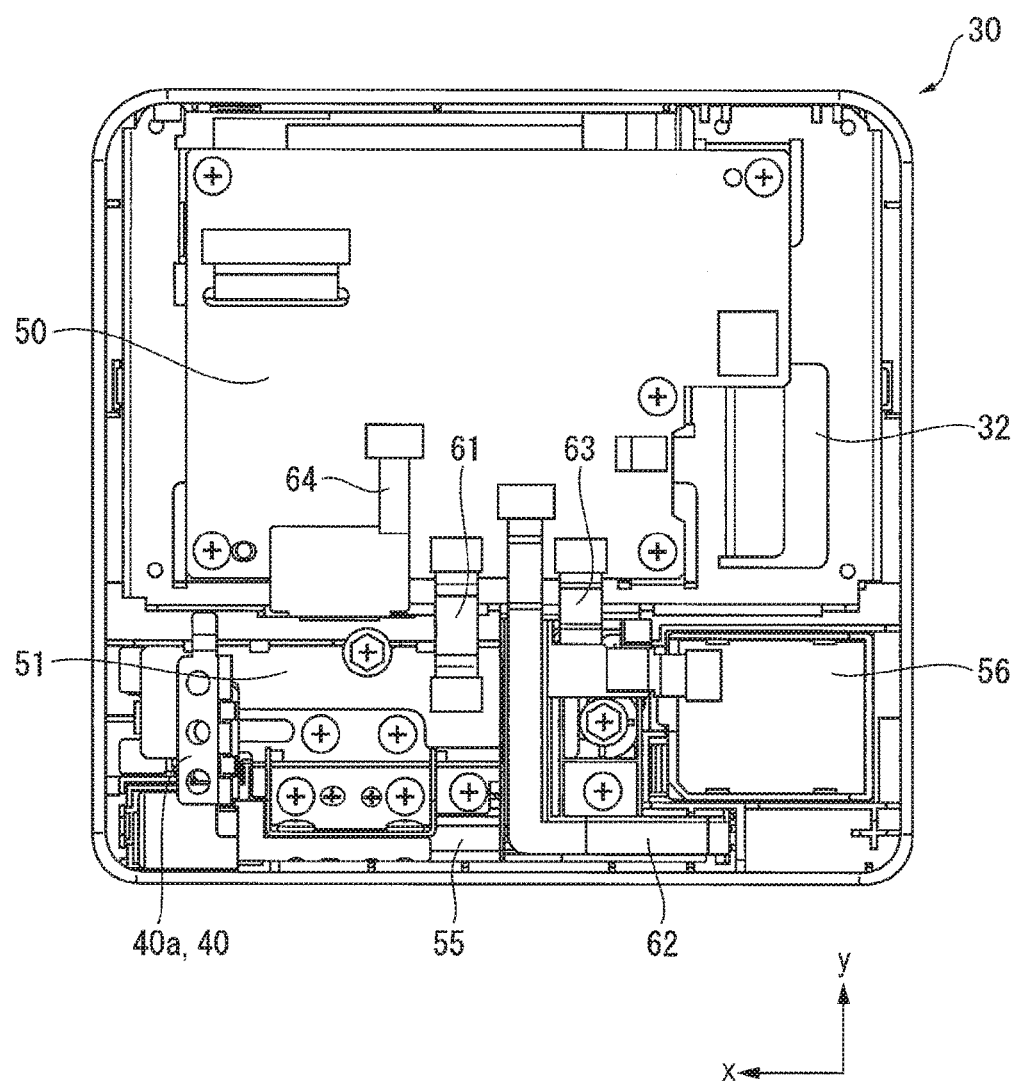
FIG. 5 is a rear view illustrating the display device according to the exemplary embodiment with a rear covering removed.

According to the present exemplary embodiment, when the rear covering 39 of the display housing 31 is detached, a control board 50 and a switch board 51 as illustrated in FIG. 5 are seen. The control board 50 provided on the rear side of the touch panel 32 controls the image forming apparatus 20. The switch board 51 is provided in a region on the rear side of the power switch 33 and the menu switch 34. An electromagnetic noise resistant covering 65 (see FIG. 9) is provided between the rear covering 39 and the control board 50.

Furthermore, a first display-light-emitting unit 55 is provided in a region on the rear side of the first illuminated portion 35, a second display-light-emitting unit 56 is provided in a region on the rear side of the second illuminated portion 36, and a third display-light-emitting unit 57 (see FIG. 7) is provided in a region on the rear side of the third illuminated portion 37.

Reference numerals 61 to 64 denote harnesses. The harnesses are each in the form of a flexible printed circuit (FPC) or a flexible flat cable (FFC). These harnesses connect the control board 50 to the switch board 51 and the first to third display-light-emitting units 55 to 57.

According to the present example, the first display-light-emitting unit 55 is disposed close to the second display-light-emitting unit 56 and the third display-light-emitting unit 57.

Here, the second display-light-emitting unit 56 includes an NFC board 561 on which an LED (not illustrated) that indicates the state is disposed. The NFC board 561 is held to the display housing 31 by, for example, snap fitting with, for example, an opal holder (not illustrated) interposed therebetween. According to the present example, the thickness of a position of the holder (not illustrated) corresponding to the LED of the NFC board 561 is reduced. Thus, when the LED emits light, the second illuminated portion 36 transmits the light through the portion of the holder where the thickness is reduced.

Figure 6:
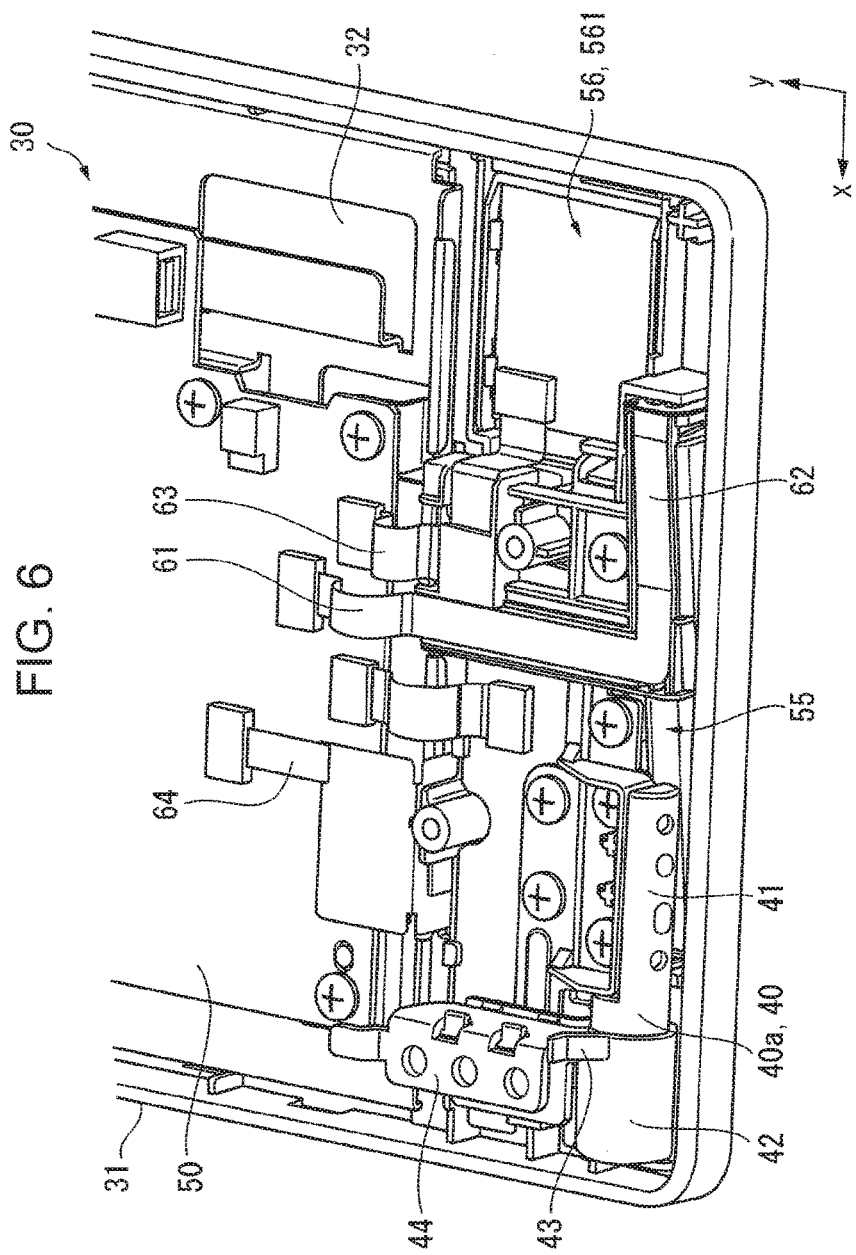
FIG. 6 is a perspective view of part of the display device of FIG. 5.
Figure 7:
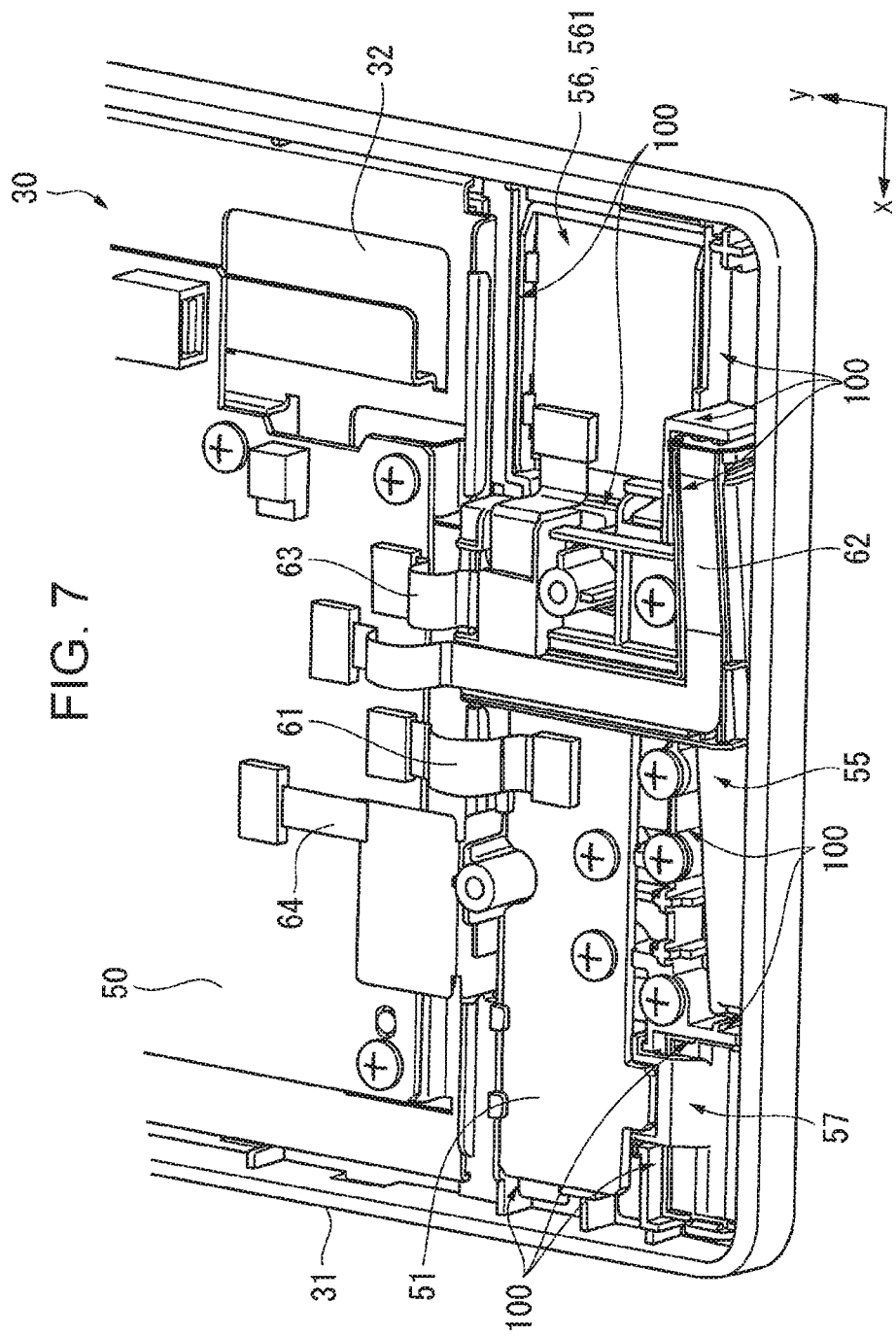
FIG. 7 is a perspective view of part of the display device of FIG. 6 with parts of a hinge structure disposed in a display housing removed.

Furthermore, as illustrated in FIGS. 5 to 7, the third display-light-emitting unit 57 includes an LED and the light guide lens which are housed in a unit case. The LED of the third display-light-emitting unit 57 emits light in accordance with information on data reception performed by the control board 50. The light guide lens guides light from the LED of the third display-light-emitting unit 57 from the switch board 51 where the LED of the third display-light-emitting unit 57 is mounted to the third illuminated portion 37.

The details of the first display-light-emitting unit 55 will be described later.

The Hinge Structure

Figure 8:
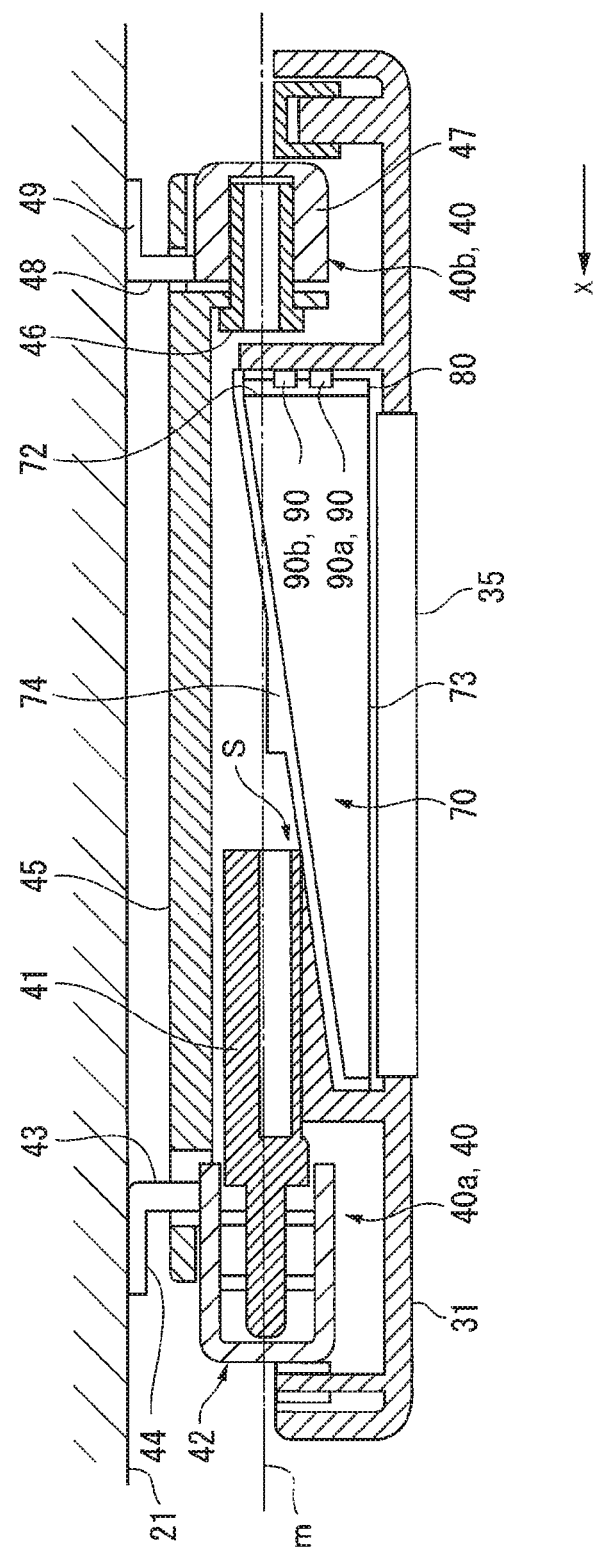
FIG. 8 is a sectional view illustrating the display taken along line VIII-VIII of FIG. 4.
Figure 9:
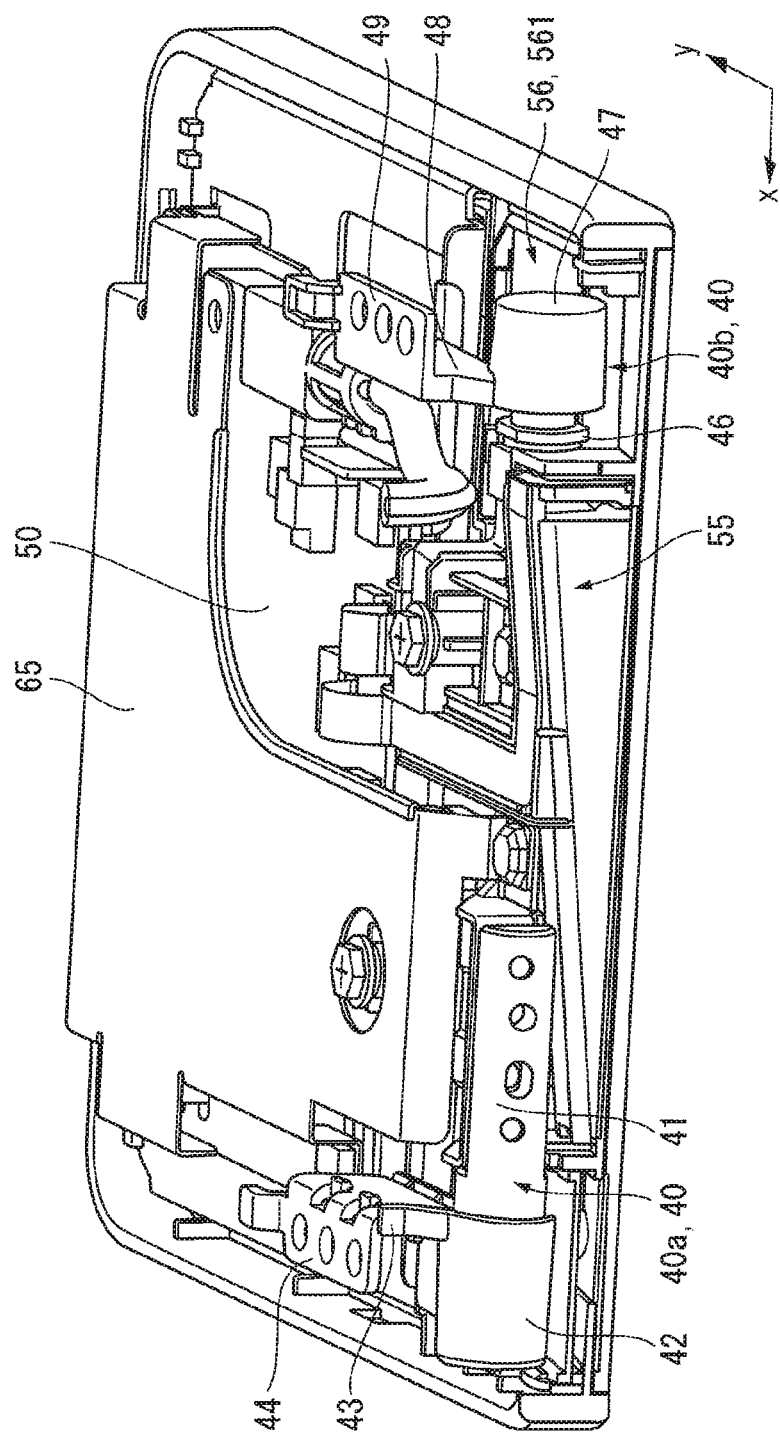
FIG. 9 is a sectional view illustrating the relationship between a first display-light-emitting unit and the hinge structure of the display device according to the exemplary embodiment taken along line IX-IX of FIG. 4.

According to the present exemplary embodiment, as illustrated in FIGS. 4, 8, and 9, the hinge structure 40 includes a pair of hinge elements 40a and 40b respectively on one and the other sides of the first display-light-emitting unit 55 at the one side edge of the display housing 31.

One of the hinge elements of the hinge structure 40 (hinge element 40a) is structured as follows: that is, a support shaft 41 is secured to part of the display housing 31, a hollow bearing roller 42 is rotatably fitted onto the support shaft 41, a hinge arm 43 is provided so as to radially project from an outer circumference of the bearing roller 42, and the hinge arm 43 is provided with a bracket 44 that is secured to the apparatus housing 21 using a securing member.

The other hinge element of the hinge structure 40 (hinge element 40b) is structured as follows: that is, a support shaft 46 is secured to part of a frame 45, which is attached to a portion of the rear covering 39 of the display housing 31 near the hinge structure 40, a hollow bearing roller 47 is rotatably fitted onto the support shaft 46, a hinge arm 48 is provided so as to radially project from an outer circumference of the bearing roller 47, and the hinge arm 48 is provided with a bracket 49 that is secured to the apparatus housing 21 using a securing member.

According to the present example, when both the hinge elements of the hinge structure 40 (40a and 40b) are attached to the apparatus housing 21 of the image forming apparatus 20 through the brackets 44 and 49, the operating panel 30 is supported by the apparatus housing 21 through the hinge structure 40 (hinge elements 40a and 40b). In this state, the bearing rollers 42 and 47 of the hinge structure 40 (hinge elements 40a and 40b) are supported so as to be rotatable relative to the support shafts 41 and 46. Thus, the operating panel 30 behaves in a manner in which the position of the operating panel 30 changes about a rotational center m of the support shafts 41 and 46.

The First Display-Light-Emitting Unit

According to the present exemplary embodiment, as illustrated in FIG. 3, the first illuminated portion 35 has an elongated region R extending in a direction along the rotational center of the hinge structure 40. The first display-light-emitting unit 55 has, as illustrated in FIGS. 9 to 12, an elongated structure extending along the first illuminated portion 35.

According to the present example, the first display-light-emitting unit 55 includes a light guide lens 70, a holder 80, and a light source 90. The light guide lens 70 serving as the light guide member guides light. The holder 80 serving as the holding member holds the light guide lens 70. The light from the light source 90 is incident upon the light guide lens 70.

The Light Guide Lens

The light guide lens 70 is an elongated member 71 (having a dimension L in the longitudinal direction) extending in the longitudinal direction along the rotational center of the hinge structure 40. The light guide lens 70 has a light incident portion 72, upon which the light is incident, at one end of the elongated member 71 in the longitudinal direction and a light exit portion 73, through which the light exits, at one side surface extending in the longitudinal direction of the elongated member 71. Furthermore, the width in a direction separating from the light exit portion 73 on the other end side is reduced compared to that on the one end side in the longitudinal direction. Thus, a reflecting portion 74 is provided on the other side surface extending in the longitudinal direction facing the light exit portion 73.

Figure 11:
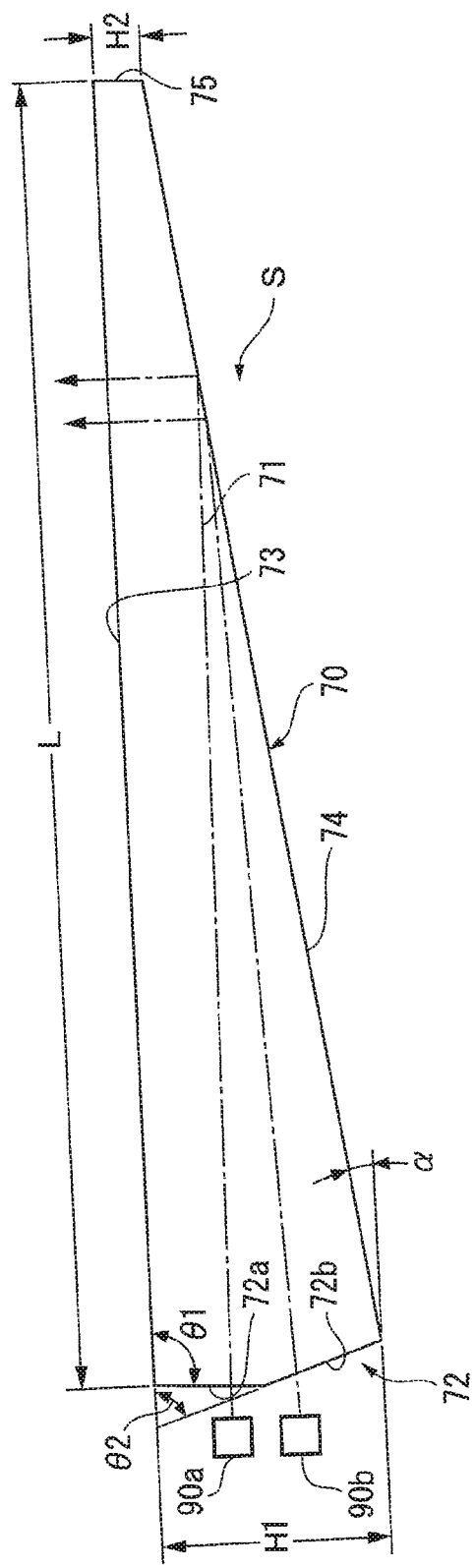
FIG. 11 illustrates an example of a light guide lens of the first display-light-emitting unit used in the exemplary embodiment.

According to the present example, for example, as illustrated in FIG. 11, when the dimensions of the elongated member 71 of the light guide lens 70 on the one and the other end sides are respectively H1 and H2, H1>H2 is satisfied. Regarding the specific dimensional relationships of the light guide lens 70, an inclination angle α of the reflecting portion 74 may be determined by defining H1 and H2 as fixed values at both end portions of the light exit portion 73.

The Holder

Figure 10:
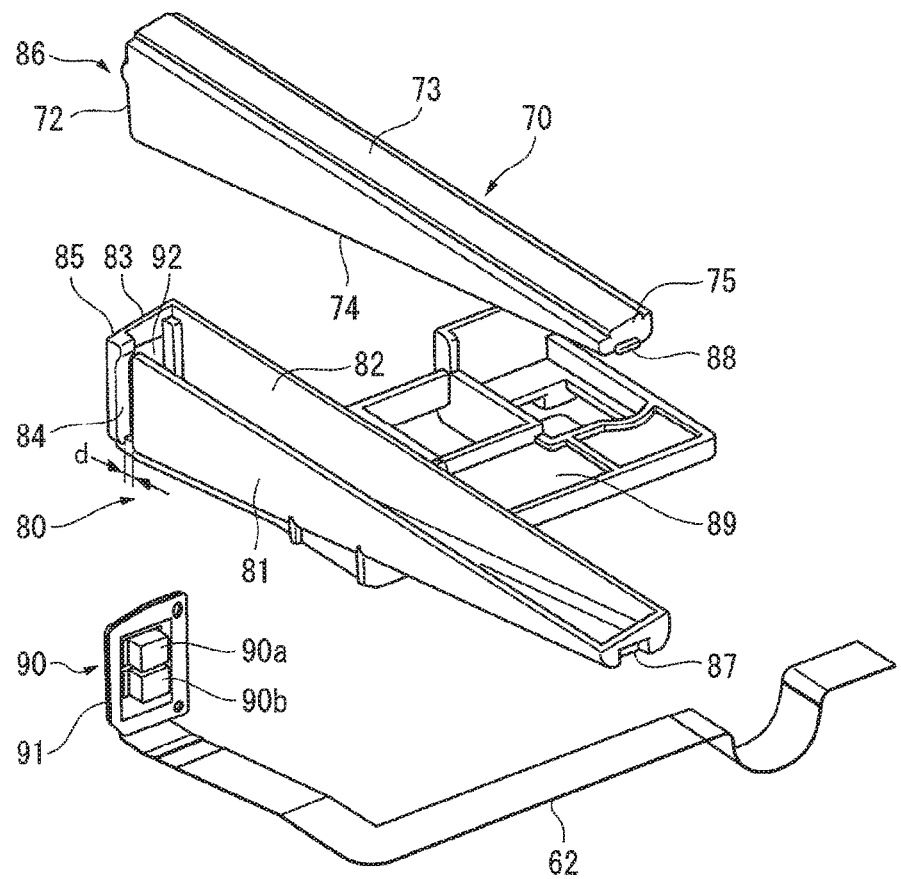
FIG. 10 is an exploded perspective view of the first display-light-emitting unit used in the exemplary embodiment.

As illustrated in, for example, FIG. 10, the holder 80 includes a non-transparent resin or rubber material to hold the light guide lens 70. The holder 80 includes a holder body 81 having an opening 82 at its portion facing the light exit portion 73 of the light guide lens 70. The holder 80 has a housing space therein that has a shape substantially corresponding to the shape of the light guide lens 70.

Furthermore, according to the present example, in order to form an elastically deformable holding piece 83 at a portion of the holder body 81 facing the light incident portion 72 of the light guide lens 70, a cut 84 is provided at a portion adjacent to the holding piece 83 by cutting the holder body 81 along the light incident portion 72 of the light guide lens 70. According to the present example, the cut 84 has a rectangular shape in which, when the gap dimension from the holding piece 83 is represented as d, the dimension along the light incident portion 72 of the light guide lens 70 is longer than d. Thus, according to the present example, since the holding piece 83 is cut by the cut 84, a corner portion of the holding piece 83 facing the cut 84 is elastically deformable so as to enlarge the cut 84. Reference numeral 89 of FIG. 10 denotes a base member that maintains the holder body 81 in a predetermined position when the holder body 81 is attached to the display housing 31. The base member 89 is integrally formed with the holder body 81 according to the present example.

Figure 12A:
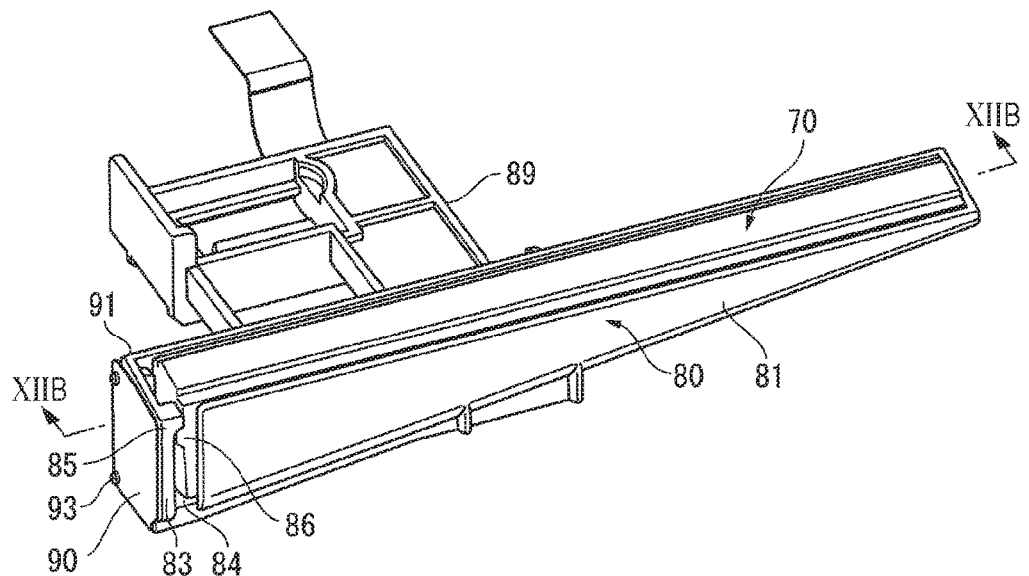
FIG. 12A is a perspective view of an overall structure of the first display-light-emitting unit.

Furthermore, according to the present exemplary embodiment, as illustrated in FIGS. 9, 10, and 12A, a retainer 85 having a projecting shape is formed near the corner portion of the holding piece 83 facing the cut 84. The retainer 85 faces and projects into the cut 84. In contrast, a retained portion 86 having a projecting shape is formed at part of the light incident portion 72 of the light guide lens 70 so as to face and project into the cut 84. Thus, when the light guide lens 70 is fitted into the holder 80, the retained portion 86 is retained by the retainer 85 after the retained portion 86 has abutted the retainer 85 on the holding piece 83 side so as to cause the holding piece 83 to be elastically deformed. Here, according to the present example, when the retained portion 86 is retained by the retainer 85, the holding piece 83 is elastically deformed so as to slightly enlarge the cut 84, thereby pressing the light guide lens 70 toward the other end opposite to the light incident portion 72 in the longitudinal direction through abutment between the retainer 85 and the retained portion 86. Accordingly, the light guide lens 70 is pressed by the holding piece 83 in the holder 80, so that the light guide lens 70 is held at a position in the holder 80 where the light guide lens 70 has been moved to the other end side in the longitudinal direction.

Figure 12B:
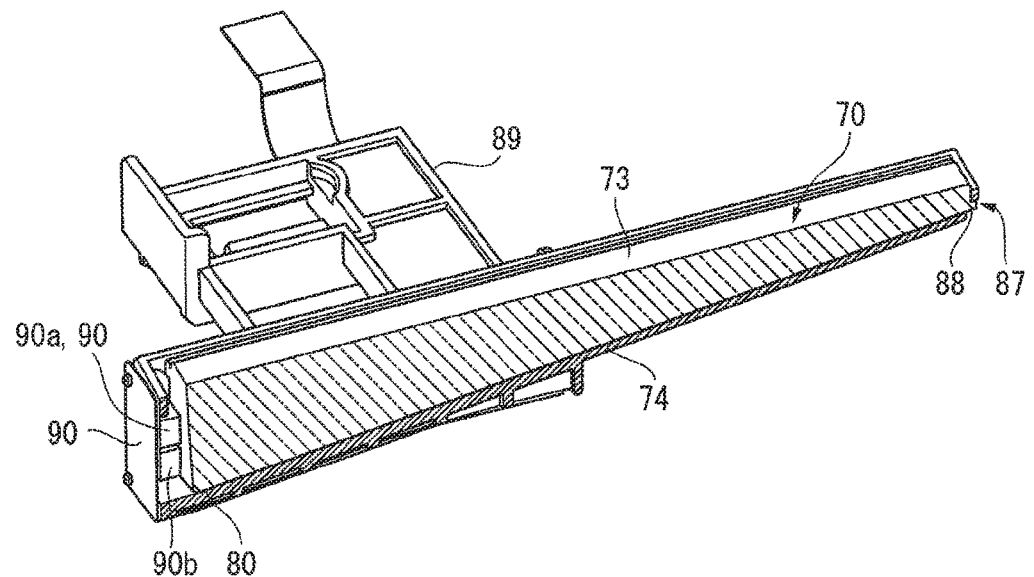
FIG. 12B is a sectional view illustrating the first display-light-emitting unit taken along line XIIB-XIIB of FIG. 12A.

Furthermore, according to the present exemplary embodiment, as illustrated in FIGS. 10 and 12B, a positioning hole 87 is formed at a portion of the holder 80 facing the holding piece 83. In contrast, a positioning projection 88, which is insertable into the positioning hole 87, is formed at a portion 75 of the light guide lens 70 facing the light incident portion 72. Thus, when the positioning projection 88 formed on the light guide lens 70 reaches a position in the holder 80 corresponding to the positioning hole 87 while fitting the light guide lens 70 into the holder 80, the light guide lens 70 is pressed due to elastic deformation of the holding piece 83, and accordingly, the positioning projection 88 is fitted into the positioning hole 87. This causes the portion 75 of the light guide lens 70 facing the light incident portion 72 to be positioned relative to the holder 80.

Thus, according to the present exemplary embodiment, the light guide lens 70 may be held in the holder 80 with a good positional accuracy.

The Light Source

According to the present example, as illustrated in FIGS. 9, 10, and 12A, plural (two according to the present example) light emitting elements (for example, LEDs) 90a and 90b, which emit light of different colors, are used for the light source 90. The plural light emitting elements 90a and 90b are disposed on a light source board 91, which is connected to an end portion of a harness 62 from the control board 50.

The structure for attachment of such a light source 90 may be as follows: that is, an attachment opening 92 is formed in the holding piece 83 of the holder 80; the light source board 91 abuts from the outside of the holder 80 so as to close the attachment opening 92 of the holding piece 83; the light source board 91 is secured to an edge of the attachment opening 92 with securing members 93, and the light emitting elements 90a and 90b disposed on the light source board 91 are disposed at positions facing the light incident portion 72 of the light guide lens 70.

According to the present example, the first light emitting element 90a emits blue light, and the second light emitting elements 90b emits amber light. Here, types of information represented by the light emitting elements 90a and 90b may be appropriately selected.

The light emitted from the light emitting elements 90a and 90b is incident upon the light incident portion 72 of the light guide lens 70, reflected by the reflecting portion 74 of the light guide lens 70, and then exits through the light exit portion 73 of the light guide lens 70 so as to illuminate the first illuminated portion 35.

Optical Interference Between the Plural Display-Light-Emitting Units

According to the present exemplary embodiment, the first display-light-emitting unit 55 and the second display-light-emitting unit 56 are disposed close to each other, and the holder 80 of the first display-light-emitting unit 55 has the cut 84. However, this cut 84 is provided on the opposite side to the second display-light-emitting unit 56. Thus, even when the light leaks through the cut 84 of the first display-light-emitting unit 55, the likelihood of the light having leaked through the cut 84 traveling to and reaching the second display-light-emitting unit 56 side and the likelihood of the light from the second display-light-emitting unit 56 traveling to and entering the cut 84 of the first display-light-emitting unit 55 may be suppressed. Thus, optical interference between the first display-light-emitting unit 55 and the second display-light-emitting unit 56 may be effectively prevented.

Furthermore, optical interference between the first display-light-emitting unit 55 and the third display-light-emitting unit 57, which are disposed close to each other, may be effectively prevented because the cut of the first display-light-emitting unit 55 is disposed on the opposite side to the third display-light-emitting unit 57.

Furthermore, according to the present exemplary embodiment, light blocking walls 100 that surround the first, second, and third display-light-emitting units 55, 56, and 57 are formed in the display housing 31. Thus, optical interference between the first, second, and third display-light-emitting units 55, 56, and 57 may be more reliably prevented.

Design of an Optical Path from the Light Source

According to the present exemplary embodiment, the plural light emitting elements 90a and 90b are disposed as the light source 90 in the first display-light-emitting unit 55 so as to face the light incident portion 72 of the light guide lens 70. Furthermore, the distance between the light emitting element 90a and the light exit portion 73 of the light guide lens 70 is different from the distance between the light emitting element 90b and the light exit portion 73 of the light guide lens 70. Thus, when the light incident portion 72 of the light guide lens 70 is a common plane, there is a difference in optical path length from the light incident portion 72 to the light exit portion 73 through the reflecting portion 74 between the light emitting elements 90a and 90b. Thus, there may be a marked difference in amount of light between the light emitted from the light emitting element 90a and the light emitted from the light emitting element 90b. This may be eliminated by adjusting the amounts of light emitted from the light emitting elements 90a and 90b in advance.

Alternatively, even without adjustment of the amounts of light emitted from the light emitting elements 90a and 90b, the optical path lengths of the light emitting elements 90a and 90b from the light incident portion 72 to the light exit portion 73 through the reflecting portion 74 may be set to be substantially the same by, for example, as illustrated in FIG. 11, setting angles between the light incident portion 72 and the light exit portion 73 for the first light emitting element 90a and the second light emitting elements 90b to be different from each other at the light incident portion 72 of the light guide lens 70, so that the incident angles of the light emitted from the light emitting elements 90a and 90b are different from each other.

For example, when, for the first light emitting element 90a close to the light exit portion 73 of the light guide lens 70, an angle between the light exit portion 73 and a light incident portion 72a being part of the light incident portion 72 is θ1 and, for the second light emitting elements 90b far from the light exit portion 73, an angle between the light exit portion 73 and a light incident portion 72b being part of the light incident portion 72 is θ2, θ1 and θ2 may be selected as such values that allows substantially the same optical path lengths to the light exit portion 73 to be obtained on condition that θ1>θ2 is satisfied. In this case, as illustrated in FIG. 11, it is sufficient that θ1 and θ2 be selected so that the optical path length of the light from the second light emitting elements 90b, which is refracted by the light incident portion 72b and reaches the light exit portion 73 through the reflecting portion 74, is substantially the same as the optical path length of the light from the first light emitting element 90a.

Arrangement Relationship Between the Hinge Structure and the First Display-Light-Emitting Unit According to the present exemplary embodiment, the first display-light-emitting unit 55 includes the elongated light guide lens 70 as illustrated in FIGS. 8, 9, and 11. The width of the light guide lens 70 is reduced on the other end side thereof so as to satisfy H1>H2 where H1 and H2 are the dimensions of the light guide lens 70 on the one end side and the other end side, respectively. Accordingly, compared to the case where the width of the light guide lens 70 is the same on both the end sides in the longitudinal direction, an additional space S may be obtained at a position that would otherwise be a region where the light guide lens 70 is disposed around the other end side of the light guide lens 70 where the width of the light guide lens 70 is reduced according to the present exemplary embodiment.

According to the present exemplary embodiment, as illustrated in FIG. 8, the hinge structure 40 (hinge element 40a) is disposed by utilizing this additional space S. Thus, the light guide lens 70 is an elongated member extending in a direction along the rotational center m of the hinge structure 40 and disposed at a position that intersects the rotational center m. Accordingly, the first display-light-emitting unit 55 and the hinge structure (hinge element 40a) may be effectively arranged in the display housing 31 without wasting spaces.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
a display housing; and
a plurality of display-light-emitting devices disposed close to one another in the display housing,
wherein at least one of the plurality of display-light-emitting devices includes
a light guide member that includes a light incident portion upon which light is incident, a light exit portion through which the light exits, and a reflecting portion and that causes the light incident upon the light incident portion to be reflected by the reflecting portion so as to guide the light to the light exit portion,
a holding member that has an opening at a portion thereof facing the light exit portion of the light guide member so as to house the light guide member, that includes an elastically deformable holding piece disposed at a portion thereof facing the light incident portion, and that holds the light guide member by using the holding piece, and
a light source provided at a portion which is in the holding member and which faces the light incident portion of the light guide member,
wherein the holding member has a cut that allows the holding piece to be elastically deformed and that is disposed on an opposite side to another of the plurality of display-light-emitting devices disposed near the at least one of the plurality of display-light-emitting devices.

2. The display device according to claim 1,
wherein the holding member has a retainer that has a projecting shape or a recessed shape at part of the holding piece facing the cut, and
wherein the light guide member has a retained portion that has a projecting shape or a recessed shape at part of the light incident portion and that is retained by the retainer after the retained portion has abutted the retainer so as to cause the holding piece to be elastically deformed.

3. The display device according to claim 1,
wherein the holding member has a positioning portion at a portion thereof facing the holding piece, and the light guide member is positioned using the positioning portion, and
wherein the light guide member has a positioned portion at a portion thereof facing the light incident portion, and the positioned portion is engaged with the positioning portion so as to be able to be positioned.

4. The display device according to claim 1,
wherein the light guide member is an elongated member that extends in a longitudinal direction, that includes one side surface and another side surface extending in the longitudinal direction, and that has one end side and another end side in the longitudinal direction,
wherein the one end side serves as the light incident portion and the one side surface serves as the light exit portion, and
wherein a width of the light guide member in a direction away from the light exit portion is reduced on the other end side compared to the one end side so as to have the reflecting portion in the other side surface facing the light exit portion.

5. The display device according to claim 1,
wherein a position of the display housing is changeable by using a hinge structure, and part of the hinge structure is disposed in the display housing.

6. The display device according to claim 5,
wherein the hinge structure is rotatable about a rotational center thereof, and
wherein the light guide member is an elongated member extending in a direction along the rotational center of the hinge structure and disposed at a position that intersects the rotational center.

7. The display device according to claim 1,
wherein, in the holding member, an attachment opening used to attach the light source is formed in the holding piece, and the light source is attached so as to close the attachment opening.

8. The display device according to claim 1, further comprising:
a display screen,
wherein the display housing includes a surface portion, and
wherein an area occupied by the display screen is ½ or more of an area of the surface portion, and the plurality of display-light-emitting devices include illuminated portions disposed at a region of the surface portion other than a region occupied by the display screen.

9. A processing apparatus comprising:
an apparatus housing in which a processing unit is disposed; and
the display device according to claim 1 that is attached to the apparatus housing and that displays an operating state of the processing unit.

* * * * *